(No Model.) 2 Sheets—Sheet 1.

H. F. BELCHER.
FRAMING PRISM LIGHTS OR TILES.

No. 586,229. Patented July 13, 1897.

Witnesses:
Frank S. Blanchard
H. C. White

Inventor:
Henry F. Belcher,
By Francis W. Parker,
Attorney.

(No Model.) 2 Sheets—Sheet 2.

H. F. BELCHER.
FRAMING PRISM LIGHTS OR TILES.

No. 586,229. Patented July 13, 1897.

Witnesses
Frank S. Blanchard
H. R. White

Inventor
Henry F. Belcher
By James W. Parker,
Attorney.

THE NORRIS PETERS CO., PHOTO-LITHO., WASHINGTON, D. C.

UNITED STATES PATENT OFFICE.

HENRY F. BELCHER, OF NEW YORK, N. Y., ASSIGNOR TO THE LUXFER PRISM PATENTS COMPANY, OF CHICAGO, ILLINOIS.

FRAMING PRISM LIGHTS OR TILES.

SPECIFICATION forming part of Letters Patent No. 586,229, dated July 13, 1897.

Application filed April 19, 1897. Serial No. 632,706. (No model.)

*To all whom it may concern:*

Be it known that I, HENRY F. BELCHER, a citizen of the United States, residing at New York, in the county of New York and State of New York, have invented certain new and useful Improvements in Framing Prism Lights or Tiles, of which the following is a specification.

My invention relates to framing prism lights, tiles, or the like, and has for its object to provide a new and improved frame by means of which said prism lights, tile, or the like may be firmly secured together.

My invention is illustrated in the accompanying drawings, wherein—

Figure 1:
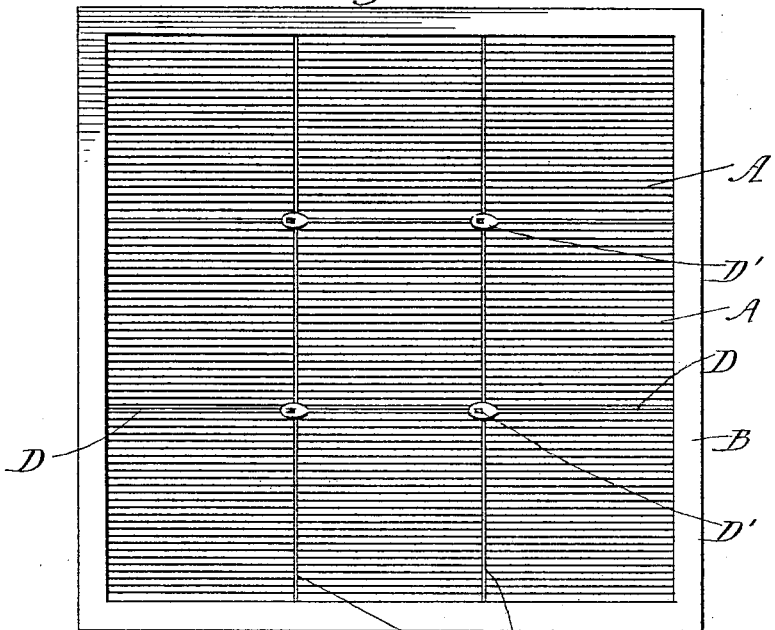
Figure 2:
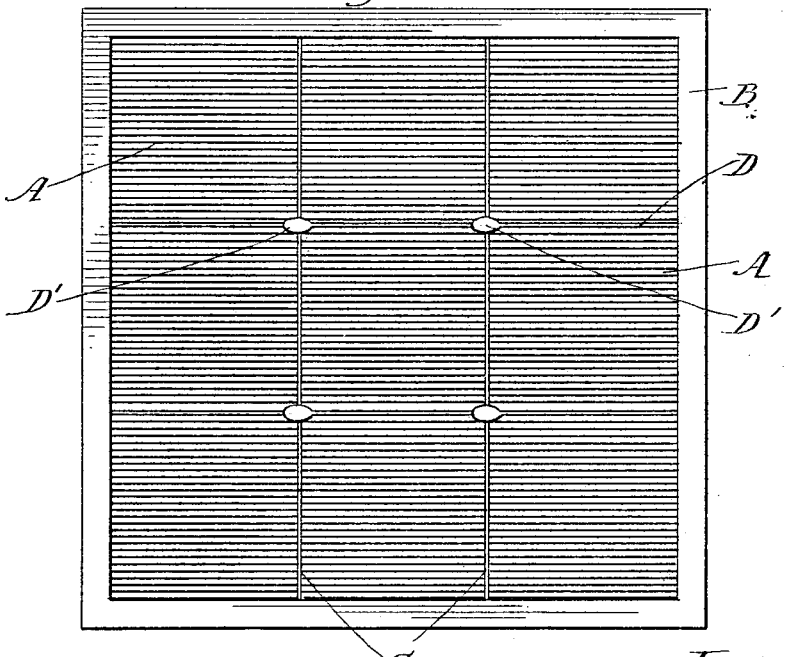
Figure 3:
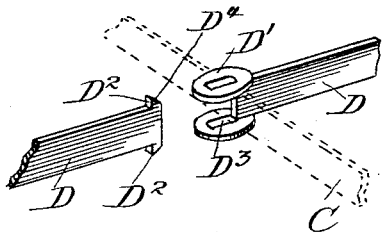
Figure 4:
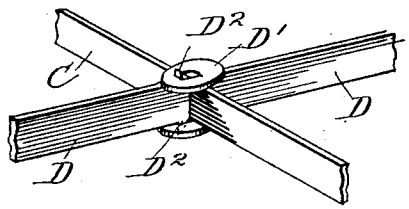
Figure 5:
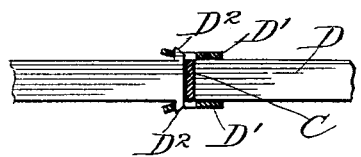
Figure 6:
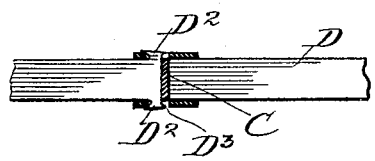
Figure 7:
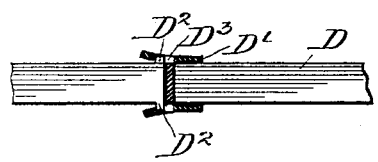
Figure 8:
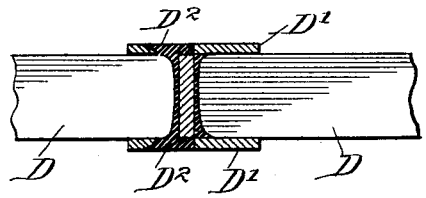
Figure 9:
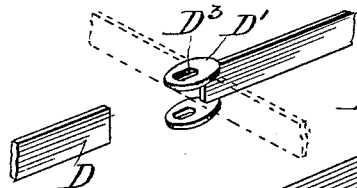
Figure 10:
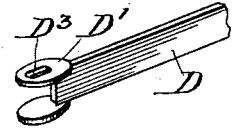
Figure 11:
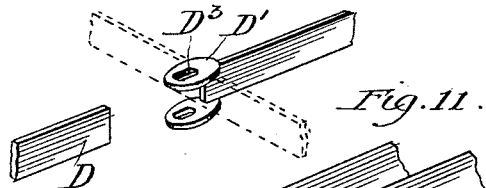

Figure 1 is a view of a prism-plate embodying my invention. Fig. 2 is a view similar to that shown in Fig. 1 after the joints in the connecting-pieces of the frame have been soldered together. Fig. 3 is a view showing the separated ends of the connecting-pieces of the frame. Fig. 4 is a similar view with the ends of the connecting-pieces connected together. Fig. 5 is a sectional view showing the parts in the relation indicated in Fig. 4. Fig. 6 is a view similar to Fig. 5 after the connecting-pieces have received a blow, showing the parts riveted together. Fig. 7 is a view similar to Fig. 5, showing a somewhat-modified construction. Fig. 8 is an enlarged view similar to Fig. 6 after the joint has been soldered. Fig. 9 is a view similar to Fig. 3, showing a modified construction of the ends of the connecting-pieces. Fig. 10 shows a further modification. Fig. 11 is a perspective view showing the joint after completion.

Like letters refer to like parts in the several figures.

I have illustrated my invention in connection with the framing of prism-lights.

As shown in Fig. 1, a series of prism-lights A A are formed into a prism-plate and are separated by the warps C and the cross-pieces D, preferably made of comparatively thin metal. The warps C extend the length of the plate and the cross-pieces D are inserted between said warps and are provided at their ends with the lugs or enlarged portions D', which engage the corners of the prism-lights and by which the several cross-pieces are connected together. Fig. 1 shows the prism-plate before the joints between the connecting-pieces are soldered, and Fig. 2 shows the prism-plate after the joints have been soldered. The warps C pass between the lugs or enlarged parts E' on the cross-pieces D, as shown, for example, in Figs. 3 and 4. Most of these cross-pieces are formed with the lugs at one end only, the other end being formed with the projections $D^2$. The lugs D' are provided with the openings $D^3$ to receive these projections. Said lugs are sprung apart to allow the projections to enter the openings $D^3$ and then spring back to their normal position, thus connecting the ends of the connecting-pieces together.

As illustrated in Fig. 3, the projections $D^2$ are provided with beveled faces $D^4$; but it is of course evident that these beveled faces may be dispensed with, as indicated, for example, in Fig. 7. After the ends of the cross-pieces D have been connected together, as shown in Figs. 4 and 5, the projections $D^2$ are bent or mutilated in any convenient manner so as to engage the lugs D', thus forming a strong and durable joint, as shown, for example, in Fig. 6. The riveting of these projections forces the ends of the cross-pieces against the warp C, thereby producing a tight and secure joint. After the joints between the cross-pieces have been formed, as shown in Fig. 6, the prism-plate may then be immersed in an electrolytic bath and the frame completed by depositing metal upon the warps C and the cross-pieces D. The riveting of the ends of the cross-pieces brings the several parts into intimate contact, so as to form them into a continuous electrical conductor.

If desired, the several joints may be soldered before the plate is put into the electrolytic bath.

On heating the joint (shown, for example, in Fig. 6) to prepare it for the solder the soldering-iron comes in contact with the several parts united at the joint, so that such parts may be thoroughly heated, thereby allowing the solder to be effectively applied, so as to join all the parts together. This joint after being soldered is illustrated in Fig. 8, and I find that an exceedingly strong and durable joint is produced. When the joint is soldered, the projections D² may be dispensed with, if desired. Such a construction is shown in Fig. 9, wherein the lugs D' on one end of the cross-pieces are provided with the openings D³, while the ends of the cross-pieces that fit between these lugs are plain, as shown in said figure. These ends are placed in position, and a small soldering-iron is inserted in the opening D³, so as to make contact with the warp and both connecting-pieces. All three pieces are thus easily and quickly heated, and a perfect soldered joint may then be formed.

Instead of providing both the lugs D' with the openings D³, I may only provide an opening in one of the lugs, as shown, for example, in Fig. 10.

I have described my invention in connection with prism-lights; but it is of course evident that it may be used in connection with any other suitable material.

It is also evident that the several parts which I have described may be varied in form and construction without affecting the result desired, and I therefore do not wish to be limited in any manner by the construction shown.

I claim—

1. A frame for connecting separate pieces into a plate, comprising a surrounding outer frame, provided with a series of cross-pieces, a series of connecting-pieces between said cross-pieces and extending across the frame at an angle thereto, some of said connecting-pieces provided at one end with enlarged parts or lugs adapted, when the connecting-pieces are in position, to engage said cross-pieces; the other end of said connecting-pieces adapted to fit between the lugs or enlarged parts on the adjoining connecting-piece, one of said lugs on each cross-piece being perforated so as to expose the connecting-piece and cross-piece engaged thereby.

2. A frame for connecting separate pieces into a plate, comprising a surrounding outer frame, provided with a series of cross-pieces, a series of connecting-pieces between said cross-pieces and extending across the frame at an angle thereto, some of said connecting-pieces provided at one end with enlarged parts or lugs adapted, when the connecting-pieces are in position, to engage said cross-pieces; the other end of said connecting-pieces adapted to fit between the lugs or enlarged parts on the adjoining connecting-piece, and provided with projections, which project through openings in said lugs so as to connect the parts together.

3. A frame for connecting separate pieces into a plate, comprising a surrounding outer frame, provided with a series of cross-pieces, a series of connecting-pieces between said cross-pieces and extending across the frame at an angle thereto, some of said connecting-pieces provided at one end with enlarged parts or lugs adapted, when the connecting-pieces are in position, to engage said cross-pieces; the other end of said connecting-pieces adapted to fit between the lugs or enlarged parts on the adjoining connecting-piece, and provided with projections, which project through openings in said lugs so as to connect the parts together, said projections each provided with a beveled or inclined face.

4. A frame for connecting separate pieces into a plate, comprising a surrounding outer frame, provided with a series of cross-pieces, a series of connecting-pieces between said cross-pieces and extending across the frame at an angle thereto, some of said connecting-pieces provided at one end with enlarged parts or lugs adapted, when the connecting-pieces are in position, to engage said cross-pieces; the other end of said connecting-pieces adapted to fit between the lugs or enlarged parts on the adjoining connecting-piece, one of said lugs on each cross-piece being perforated so as to expose the connecting-piece and cross-piece engaged thereby, said parts being fastened together by means of solder inserted through said opening.

5. A frame for connecting separate pieces into a plate, comprising a surrounding outer frame, provided with a series of cross-pieces, a series of connecting-pieces between said cross-pieces and extending across the frame at an angle thereto, some of said connecting-pieces provided at one end with enlarged parts or lugs adapted, when the connecting-pieces are in position, to engage said cross-pieces; the other end of said connecting-pieces adapted to fit between the lugs or enlarged parts on the adjoining connecting-piece, and provided with projections, which project through openings in said lugs so as to connect the parts together, said projections being battered or riveted so as to lock the parts in position.

6. A frame for connecting separate pieces into a plate, comprising a surrounding outer frame, provided with a series of cross-pieces, a series of connecting-pieces between said cross-pieces extending across the frame at an angle thereto, some of said connecting-pieces provided at one end with enlarged parts or lugs adapted, when the connecting-pieces are in position, to engage said cross-pieces; the other end of said connecting-pieces adapted to fit between the lugs or enlarged parts on the adjoining connecting-piece, and provided with projections, which project through openings in said lugs so as to connect the parts together, said projections being battered or riveted so as to lock the parts in position, and a quantity of solder engaging the several parts so as to form the finished joint.

7. A joint for frames and the like, comprising a cross-piece, a connecting-piece provided at its end with projecting lugs, between which said cross-piece passes, one of said lugs provided with an opening through which said cross-piece is exposed, a second connecting-piece, having its end inserted between said lugs a portion of said connecting-piece being exposed through said opening, said pieces firmly united together by means of a quantity of solder inserted through said opening.

8. A joint for frames and the like, comprising a cross-piece, a connecting-piece provided with projecting lugs, between which said cross-piece passes, each lug being provided with an opening, a second connecting-piece adapted to be inserted between said lugs, and provided with projections which project through the openings therein, and engage said lugs so as to hold the parts in position.

9. A joint for frames and the like, comprising a cross-piece, a connecting-piece provided with projecting lugs, between which said cross-piece passes, each lug being provided with an opening, a second connecting-piece adapted to be inserted between said lugs, and provided with projections which project through the openings therein, and engage said lugs so as to hold the parts in position, said projections being battered or riveted so as to connect the parts together.

10. A joint for frames and the like, comprising a cross-piece, a connecting-piece provided with projecting lugs between which said cross-piece passes, each lug being provided with an opening, a second connecting-piece adapted to be inserted between said lugs, and provided with projections which project through the openings therein, said projections being battered or riveted so as to hold the parts in place; the several parts of the joint being rigidly connected together by means of solder or the like.

HENRY F. BELCHER.

Witnesses:
DONALD M. CARTER,
BERTHA C. SIMS.